FAIRCHILD & SADLER.
Gate.
No. 65,359.
Patented June 4, 1867.
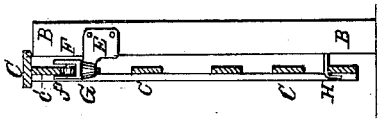
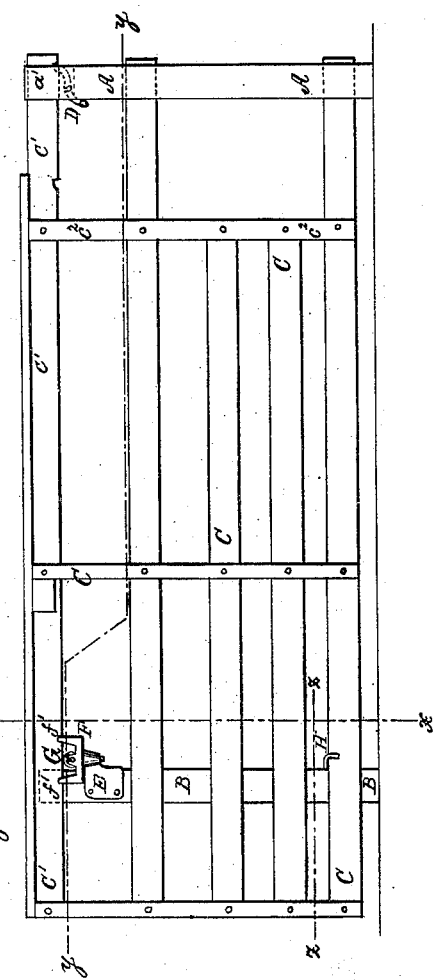
Witnesses:
J. A. Service.
Theo Fusch.
Inventors:
B. H. Fairchild
F. Sadler.
Per Munn & Co
Attys

United States Patent Office.

B. HOMER FAIRCHILD AND EMERY SADLER, OF FARMINGTON, MICHIGAN.

*Letters Patent No. 65,359, dated June 4, 1867.*

---

GATES.

---

*The Schedule referred to in these Letters Patent and making part of the same.*

---

TO ALL WHOM IT MAY CONCERN:

Be it known that we, B. HOMER FAIRCHILD and EMERY SADLER, of Farmington, in the county of Oakland, and State of Michigan, have invented a new and useful improvement in Gates; and we do hereby declare that the following is a full, clear, and exact description thereof, which will enable others skilled in the art to make and use the same, reference being had to the accompanying drawings, forming part of this specification, in which—

Figure 1 is a side view of our improved gate.

Figure 2 is a vertical section of the same taken through the line $x\,x$, fig. 1.

Figure 3 is a detail sectional view of the same taken through the line $y\,y$, fig. 1.

Figure 4 is a detail sectional view of the same taken through the line $z\,z$, fig. 1.

Similar letters of reference indicate like parts.

Our invention consists, first, in forming the gate with the forward end or ends of the upper or upper and lower horizontal bars extending out in front of the forward vertical bar, so that the gate may be partially opened and secured in place to allow the passage of small stock, while larger animals are prevented from passing; and, second, in the attachment by means of which the gate is supported and pivoted to the rear post, and by means of which the gate is secured in place when closed or when partially closed.

A is the front and B, the rear gate posts, which may be ordinary fence posts, and to one side of which the boards of the fence may be secured in the ordinary manner. C is the gate, the upper horizontal bar $c^1$ or the upper and one or more of the other horizontal bars of which project beyond the forward vertical bar $c^2$. When the gate is closed these projecting ends enter mortises or slots formed in or upon the side of the front post A. When desired, the holes for the reception of the projecting ends of said bar or bars may be formed by attaching a board, $a^1$, to the side of the post A, said board being kept in the proper position by the interposition of blocks of the requisite thickness. D is the catch that holds the gate closed. This catch is made substantially in the form shown in fig. 1, and it is pivoted in the bottom of the slot or mortise that receives the forward end of the bar $c^1$, as shown. The projecting end of the catch D, (which terminates in a knob or handle for convenience in operating it,) is made heavier, so that when left free the other end may be raised up to enter a notch in the under edge of the projecting bar $c^1$, as shown in fig. 1. Several notches may be formed in the edge of said projecting bar $c^1$, so that an opening of a greater or less extent, as desired, may be formed for the passage of small stock, the projecting bars at the same time preventing the passage of all large animals. E is a casting made to fit upon the corner of the rear post B or upon the side of a round post. This casting is made with a projecting arm in which is formed an eye for the reception of the pivoting-pin of the casting F. The casting E may, if desired, be replaced by an eye-bolt screwed or driven diagonally into the post B, into the eye of which the pivoting-pin of the casting F may enter. The casting F is formed with upwardly projecting arms $f'$, between which the lower edge of the upper horizontal bar $c^1$ enters, and which serve as guides to keep the gate in position while being opened and closed. Upon the upper side of the casting F are formed bearings for the journals of the small friction-rollers G, upon which the lower edge of the bar $c^1$ rests and moves back and forth, and which supports the gate C. The spaces between the arms $f'$ and the bearings for the roller G form channels through which rain and melted snow may flow from the casting F, and thus keep it always free. Upon the under side of the casting F is formed a pivoting-pin which enters the eye of the casting E, or its equivalent, and enables the gate C, when pushed back free from the post A, to be swung around to a position at right angles to the line of the fence to fully open the passage-way. H is a hook formed by bending a rod at right angles, and driving or screwing one of its ends or arms diagonally into the lower part of the post B, as shown in figs. 1 and 4. This hook prevents the gate C from being raised up, when closed, and also serves to keep the lower part of the gate in its proper relative position while being opened and closed.

Having thus described our invention, what we claim as new, and desire to secure by Letters Patent, is—

1. The latch D, constructed substantially as described, in combination with the post A and projecting bar $c^1$ of the gate C, substantially as herein shown and described.

2. The pivoting attachments E F G, constructed substantially as described, in combination with the post D and the upper horizontal bar $c^1$ of the gate, substantially as herein shown and described and for the purposes set forth.

B. HOMER FAIRCHILD,
EMERY SADLER.

Witnesses:
J. H. FAIRCHILD,
MARK ARNOLD.